(12) United States Patent
Schröppel et al.

(10) Patent No.: US 9,334,901 B2
(45) Date of Patent: May 10, 2016

(54) ROTARY JOINT FOR UNDERWATER OPERATION AND SYSTEM EQUIPPED THEREWITH FOR GENERATING ENERGY FROM WATERPOWER

(75) Inventors: Werner Schröppel, Wendelstein (DE); Hubertus Frank, Höchstadt (DE); Georg Hofmann, Mistelgau (DE)

(73) Assignee: IMO Holding GmbH (DE)

( * ) Notice: Subject to any disclaimer, the term of this patent is extended or adjusted under 35 U.S.C. 154(b) by 53 days.

(21) Appl. No.: 14/110,301

(22) PCT Filed: Apr. 4, 2012

(86) PCT No.: PCT/EP2012/001488
§ 371 (c)(1),
(2), (4) Date: Mar. 11, 2014

(87) PCT Pub. No.: WO2012/136358
PCT Pub. Date: Oct. 11, 2012

(65) Prior Publication Data
US 2014/0191508 A1      Jul. 10, 2014

(30) Foreign Application Priority Data

Apr. 5, 2011   (DE) .................. 10 2011 016 185

(51) Int. Cl.
*F16C 33/78*   (2006.01)
*F16C 33/72*   (2006.01)
(Continued)

(52) U.S. Cl.
CPC .............. *F16C 33/72* (2013.01); *F03B 11/006* (2013.01); *F03B 11/06* (2013.01); *F03B 13/10* (2013.01); *F03B 17/061* (2013.01); *F16C 33/60* (2013.01); *F16C 33/7896* (2013.01); *F16C 19/381* (2013.01); *F16C 33/6622* (2013.01); *F16C 2360/00* (2013.01); *Y02E 10/28* (2013.01)

(58) Field of Classification Search
CPC ....... F16C 33/72; F16C 33/60; F16C 33/7896; F16C 19/381; F03B 11/06; F03B 11/006
See application file for complete search history.

(56) References Cited

U.S. PATENT DOCUMENTS 2,512,148 A * 6/1950 Gaines ........................ 384/489
2,990,220 A * 6/1961 Malone ....................... 384/484
(Continued)

FOREIGN PATENT DOCUMENTS

DE         2627195        12/1977
DE         41 42 313       6/1993
(Continued)

*Primary Examiner* — Thomas R. Hannon
(74) *Attorney, Agent, or Firm* — Pandiscio & Pandiscio

(57) ABSTRACT

A rotary joint for use in a system for generating energy from water power, the joint comprising a first rotationally symmetrical connecting element and a second rotationally symmetrical connecting element disposed concentrically with the first connecting element and rotatable relative thereto, an annular gap between the two connecting elements, and a row of rolling elements rolling along a race on each of the connecting elements, wherein provided to seal the annular gap is a sealing device having a sealing ring fixed to the first connecting element, and a circumferential sealing lip, or sealing surface, extends along a lead-in surface, wherein the second connecting element is divided into a race ring, with at least one race, and a lead-in ring with a lead-in surface for at least one sealing ring, the lead-in ring being removably connected to at least one race ring.

33 Claims, 2 Drawing Sheets

(51) Int. Cl.
*F03B 11/00* (2006.01)
*F03B 11/06* (2006.01)
*F03B 17/06* (2006.01)
*F16C 33/60* (2006.01)
*F03B 13/10* (2006.01)
*F16C 33/66* (2006.01)
*F16C 19/38* (2006.01)

(56) References Cited

U.S. PATENT DOCUMENTS 3,614,183 A * 10/1971 Berens et al. ............... 384/486
4,798,481 A    1/1989 Frank
4,848,776 A *  7/1989 Winckler ................... 277/349
4,861,171 A *  8/1989 Adachi ...................... 384/455
6,357,921 B1 * 3/2002 Dittenhofer .............. 384/455
2009/0324153 A1 12/2009 Russ et al.

FOREIGN PATENT DOCUMENTS

| | | |
|---|---|---|
| DE | 102009005556 | 7/2010 |
| DE | 102010053203 A1 * | 6/2012 |
| EP | 1 223 359 | 7/2002 |
| JP | 2008/032148 | 2/2008 |
| WO | WO 2009/049755 | 4/2009 |

* cited by examiner

ROTARY JOINT FOR UNDERWATER OPERATION AND SYSTEM EQUIPPED THEREWITH FOR GENERATING ENERGY FROM WATERPOWER

BACKGROUND OF THE INVENTION

1. Field of the Invention

The invention relates to a rotary joint for underwater operation, particularly for use in a system for generating energy from waterpower, the joint comprising two rotationally symmetrical, mutually concentric connecting elements rotatable in opposite directions about a common axis, further comprising an annular gap disposed between the two connecting elements, and at least one row of rolling elements rolling along a race on each of the first and the second connecting elements, and to seal the annular gap, a sealing device having at least one sealing ring fixed to the first connecting element and is provided with a circumferential sealing lip extending along a lead-in surface.

2. Description of the Prior Art

More than half of the earth's surface is covered by water. Many untapped resources therefore still exist both on and under the water, whether mineral resources, water power, or routes of transportation. High technology is a necessity for the exploitation of these resources, be it in the form of drilling platforms, tidal power plants, ships, etc. In cases where there is an exchange of energy with water, for example, where a mechanical system expends drive power, as in the case of ships, or where it is driven, as in the case of tidal power plants, this generally requires relative movement between various machine or system parts that are in the water, for example, the propellers or impellers of ships, the turbines of tidal power plants, etc. A problem that always arises in this context is how to seal the moving parts with respect to one another.

Assuming that 100% sealing is desired, if at all possible, this can usually be achieved only with high contact forces. This, in turn, leads to high friction and thus to high wear, thereby shortening maintenance intervals and especially service life. The lead-in surfaces of the seals are frequently affected as well, with the result that maintenance work is not limited to the replacement of a seal, but entails replacing entire components of the system.

From the disadvantages of the prior art comes the problem initiating the invention, that of improving a rotary joint for underwater operation of the cited species so as to keep maintenance work to a minimum.

SUMMARY OF THE INVENTION

This problem is solved by means of a rotary joint of the cited species comprising two rotationally symmetrical, mutually concentric connecting elements adapted to be rotated in opposite directions about a common axis of symmetry, and comprising an annular gap arranged between the two connecting elements, and at least one row of rolling elements rolling along a race on each of the first and the second connecting elements, wherein provided to seal the annular gap is a sealing device having at least one sealing ring fixed to the first connecting element and has a circumferential sealing lip that extends along a lead-in surface, by the fact that the second connecting element is divided into at least one race ring with at least one race and into a lead-in ring with a lead-in surface for at least one sealing ring, the lead-in ring being removably connected to at least one race ring.

As a result of this measure, maintenance work to deal with a worn-out lead-in surface is limited to replacing the lead-in ring concerned, while the neighboring race ring can remain in place. Since the lead-in ring does not serve a load-bearing function, there is no need to take apart the entire rotary joint if water can be kept out some other way while the seal is being replaced, for example, by hoisting the system part carried by the rotary joint out of the water for maintenance, for example in a dry dock.

The invention is further characterized by a system for generating energy from waterpower, the system comprising at least one rotary joint for underwater operation and comprising two rotationally symmetrical, mutually concentric connecting elements adapted to be rotated in opposite directions about a common axis of symmetry, and comprising an annular gap arranged between the two connecting elements, and at least one row of rolling elements rolling along a race on each of the first and the second connecting elements, wherein provided to seal the annular gap is a sealing device having at least one sealing ring fixed to the first connecting element and a circumferential sealing lip that extends along a lead-in surface, wherein the second connecting element is divided into at least one race ring with at least one race, and into a lead-in ring with a lead-in surface for at least one sealing ring, the lead-in ring being removably connected to at least one race ring.

It has been found that the invention can be used advantageously in hydropower plants equipped with water-driven turbines, such as tidal power plants, for example. At the same time, of course, the invention can also be used in conjunction with driving propellers of ships, as well as in the context of impellers, i.e., propellers surrounded by an annular or cylindrical housing. This basically pertains to all types of ship propulsion and/or control systems, for example, bow or transverse thrusters, or other ship jet propulsion systems.

It has proven advantageous for the lead-in ring to consist of a material with the same standard potential or reduction potential E° as the race ring, particularly the same material as the latter. This ensures that no contact corrosion occurs if the rings touch each other. This is especially important due to the close proximity of moisture.

It can be advantageous from other technical standpoints to make the lead-in rings and the race rings out of different materials, for example, to coat them at least partially with different materials. In that case, the reduction potentials E° are generally different. Such embodiments can make sense, for instance, if the sealing properties are adequate to counteract the formation of local elements under the effect of moisture.

The invention can be developed further particularly by having the lead-in ring consist of a different material from the race ring; for example, a more noble material, or another, non-rusting material. This particularly includes rust-free, or non-rusting, particularly corrosion- and/or acid-resistant, grades of steel. For example, steel takes on non-rusting properties with a mass fraction of at least 10.5% or, better, 12%, especially if the chromium fraction is dissolved in austenitic or ferritic solid solution. Due to this high chromium fraction, a protective and dense passivation layer of chromium oxide forms spontaneously on the surface of the lead-in ring, thus preventing further oxidation. If this oxide layer is damaged, bare metal comes into contact with the atmosphere and a new passivation layer forms again automatically, i.e., the layer is self-healing. Other alloy constituents—for example, nickel, molybdenum, manganese and/or niobium—may increase the corrosion resistance still further. For many metals, however, spontaneous passivation is less pronounced, and in these cases the passivation layer should be actively produced by a defined method. The eloxation of aluminum is one example of such a method. However, high-grade stainless steel offers high mechanical stability as well, and thus is often to be preferred as the material for the lead-in ring. Due to the limited cross section of the lead-in ring, any additional material-related costs are acceptable.

The lead-in ring should be of a nobler material than the race ring, or at least have rust-free properties, since the former is more likely to come into contact with any infiltrating moisture and thus is at higher risk of corrosion due to its spatial proximity to water. In other respects, the sealing lead-in ring should be as chemically stable as possible to ensure a longer service life for the seal.

The lead-in ring preferably is provided with a surface region, particularly a planar end face, that is in surface-abutting contact with the race ring. This ensures plane-parallel contact, which provides a favorable effect in terms of potential imbalances and the vibrations they cause.

A comparable purpose is served by a circumferential centering collar on the lead-in ring, or the race ring, which collar engages in a circumferential depression of complementary cross section to its own, provided in the respective other ring. This ensures concentric relative alignment in addition to plane-parallel positioning.

The lead-in ring can be flanged to a race ring, particularly by means of a plurality of fastening screws. This fastening method ensures a particularly sturdy connection between the two rings.

For the through-passage of the fastening screws, the lead-in ring is provided with a plurality of bores, distributed circularly about its circumference, in its contact surface with the race ring; these extend perpendicularly to the contact surface, are particularly arranged parallel to the axis of rotation, and are preferably distributed equidistantly over the circumference; the bores are preferably through-bores.

Corresponding to the through-bores of the lead-in ring are bores aligned therewith, located in the abutting surface of the race ring; these are preferably a plurality of internally threaded blind bores, which are distributed circularly over the circumference of the ring and into which fastening screws are to be screwed.

Alternatively, in specific cases the positions of the through-bores and the internally threaded blind bores can be exactly reversed, or only through-bores can be present and screws and nuts can thus be used for attachment.

Further, one or more seals, particularly sealing rings, should be provided between the lead-in ring and at least one race ring. Their function is to prevent the infiltration of water along the contact gap between the lead-in ring and the race ring. Such a sealing ring can, for example, be seated in a groove-shaped depression of a ring, particularly in the region of the particular contact surface, although the groove preferably exhibits a smaller cross section than the sealing ring it is to receive, so the sealing ring is constrained to deform when the two rings are screwed together. The sealing action per se comes from the contact pressure generated in this way. This seal is not subject to any wear, since the rings concerned do not move counter to each other.

To prevent the infiltration of water, at least one sealing ring which surrounds at least one fastening bore can be provided. In this way, all the fastening bores can be sealed individually by providing each fastening bore with a seal that is approximately concentric with it. Alternatively, there is also the option of sealing all the fastening bores with two large sealing rings extending parallel to the circumference of the ring, specifically one such sealing ring on each side of the circle of fastening bores, i.e., some radially inside said circle and some radially outside it.

The presence on the lead-in ring and the race ring of planar end faces that can be fitted together makes it possible to arrange the rings one behind the other in an axial direction. The lead-in ring should then be on the outer side of the bearing, the side facing the water, while the race ring should be on the inner side of the bearing, the side facing away from the water, so that the seal in the region of the lead-in ring protects the rolling elements and races behind it against moisture.

Particularly in the case of a radial bearing or a combined radial and axial bearing, the first connecting element should substantially overlap the lead-in ring and at least one race ring of the second connecting element in the axial direction. The gap located radially between them then has sufficient space for both the rolling elements and the seals.

It is highly advantageous if the lead-in surface is disposed on a concavely or convexly curved, particularly cylinder-jacket-shaped, surface region of the lead-in ring. This corresponds to the usual shape of the gap in a radial bearing, or a combined radial and axial bearing.

It has proven useful for the first connecting element to outwardly surround the lead-in ring and at least one race ring. The lead-in surface is thereby given a cylinder-jacket-shaped, convex form. As explained in more detail below, it is easier from a design standpoint to make a seal exert high contact pressures against a convex lead-in surface than against a concave lead-in surface.

The lead-in surface of the lead-in ring should be hardened, preferably surface-hardened. This measure makes it possible to realize high contact forces without compromising the service life of the lead-in surface.

It is within the scope of the invention that at least one sealing ring is received in a recess of the first connecting element. A sealing ring is given optimal guidance in such a recess, for example, by being in contact with, or even pressed against, the inner surfaces of the recess.

The invention can be developed further in that at least one sealing ring in the axial direction is firmly clamped in the axial direction by a clamping ring in the recess of the first connecting element. A seal can be completely constituted in this way; it is surrounded on two longitudinal edges by the recess of the first connecting element, rests by its third longitudinal edge against the lead-in surface provided for this purpose, and is surrounded on the remaining, fourth longitudinal edge, by the clamping ring, according to the invention.

In a preferred embodiment of the invention, the clamping ring is screwed to an end face of the first connecting element, particularly to the end face of the first connecting element which has the recess. A plurality of such screw connections, preferably distributed equidistantly over the circumference of the ring, makes it possible to create high contact forces, such that the inwardly disposed sealing rings are immovably secured and do not rotate along with the lead-in ring, but instead run along it despite the high contact forces exerted there.

To permit such a screw connection, the clamping ring should overlap the recess of the first connecting element in the radial direction; the screw connections can then be disposed in the region of the overlap.

The cross section of a sealing ring, as a whole, can preferably be circumscribed by a tetragon, particularly, approximately a rectangle, or even a square. This makes it possible to provide a rectangular recess in the first connecting element, a cylinder-jacket-shaped lead-in surface on the lead-in ring, and a planar clamping ring.

In particular, however, the cross section of at least one sealing ring should have two legs that are connected to each other at one end, directly or via a web. This takes account of the fact that a sealing ring comes into contact with two connecting elements. This purpose is served by a respective leg of the cross section according to the invention, and the cross-sectional indent in the region between them increases the elasticity between the two contact regions of the sealing ring, and thus promotes compensation for slight relative radial movements between the two connecting elements.

According to a preferred further development of the invention, a first cross-sectional leg of at least one sealing ring has an approximately rectangular shape and serves to anchor it to the first connecting element, particularly in the recess thereof. The two mutually approximately parallel end faces of this rear cross-sectional leg, which faces away from the lead-in ring and is preferably disposed radially outward, can absorb clamping forces from an end face of the recess and from the clamping ring according to the invention, i.e. approximately in the axial direction, and thus permit a strong friction grip.

The other cross-sectional leg of at least one sealing ring should have a sealing lip on its side facing away from the first cross-sectional leg, preferably at or near its free end. This cross-sectional leg facing toward the lead-in ring creates a rotationally movable contact with the lead-in ring and is provided for this purpose with a sealing lip having a tapered cross section; this cross-sectional region is mildly deformable owing to its continuous cross-sectional taper, and can therefore conform to the particular lead-in surface optimally, and thus with a very snug fit, particularly in response to high contact forces, while at the same time friction is kept as low as possible due to the tapered contact region.

A circumferential wire clamp can be disposed in the region between the two cross-sectional legs; this engages around the back side of the cross-sectional leg comprising the sealing lip and presses the sealing lip thereof firmly against the lead-in surface of the lead-in ring. The contact force exerted by the sealing lip radially inwardly against the lead-in surface can be considerably increased by a wire clamp of this kind.

If at least one sealing ring is arranged so that the slot or indent between the two cross-sectional legs is open to the outer side, or to the water, the water pressure in the indent between two cross-sectional legs can additionally be used to press the legs apart. This automatically increases the sealing action as the water pressure increases, making it possible for a seal of this kind to be used even at great depths under water. Such an arrangement should be chosen primarily for an outermost sealing element that directly faces the water, and, where appropriate, when more than two sealing rings are present, also for a second or even a third sealing ring, counting from the outside in.

Alternatively, an innermost sealing ring can be installed in a similar manner but exactly reversed, i.e., so that the slot or indent between the two cross-sectional legs is open to the rolling elements, or races. If a lubricant present therein is placed under pressure, the pressure can, via the respective indent, press the two cross-sectional legs apart and thus, additionally, increase the sealing action so that lubricant cannot leak out.

According to the invention, a plurality of sealing rings can be provided, every two adjacent sealing rings being separated from each other by a respective, preferably annular, particularly disk-shaped spacer element. The spacer elements can distribute the contact pressure of a clamping ring evenly over the entire circumference, and thereby optimize the positioning of the individual sealing rings and their sealing action.

If such a preferably ring- and/or disk-shaped spacer element is made of a rigid material, preferably metal, ceramic or plastic, it can best perform this function of distributing the clamping forces evenly within the area concerned.

Such a spacer element can be provided with at least one conduit extending approximately in the radial direction, for example at least one approximately radially extending through-bore. Such a bore provides access to a chamber between two sealing rings, and a lubricant can therefore, if necessary, be pressed into the chamber concerned with minimal effort.

The aim of delivering lubricant is also served by a further development of the invention, according to which a spacer element is provided with a circumferential groove on at least one curved circumferential region, preferably on its circumference facing the first connecting element. Via this circumferential groove, a delivered lubricant can be reliably conveyed by pressure to one or more radial conduits.

Also for purposes of lubrication, the first connecting element should have at least one lubricant bore, particularly a respective lubricant bore at the level of each of one or more spacer elements. Through this lubricant bore, or bores, the lubricant passes into the region of the radial channels and, from there, on through the particular spacer element directly into a chamber between two sealing rings.

Grease appears to be better suited than lubricating oil for a seal according to the invention, since the thicker consistency of lubricating grease prevents it from mixing with water.

Although embodiments with only one row of rolling elements, particularly balls, are conceivable—particularly in the case of radial bearings—preference should generally be given to embodiments with more than one row of rolling elements, inasmuch as this increases the load-bearing capacity so that larger and, above all, heavier system parts can be stabilized in the relevant case of large bearings with a diameter of one meter or more.

The same objective is pursued by a further development of the invention according to which at least one row of roller-shaped, barrel-shaped, cone-shaped or needle-shaped rolling elements is provided. Due to their linear contact region with the races concerned, such rolling elements generally have a higher load-bearing capacity than spherical rolling elements, which have nearly punctiform contact areas with the races concerned.

An embodiment that has proven to be especially workable is to have at least one connecting element formed as a so-called nose ring, comprising a collar, facing the annular gap, on which are disposed one or more races for rolling elements rolling therealong. Such a nose ring offers the possibility, via its top and bottom sides, of putting in place a respective axial row of rolling elements comprising roller-, barrel-, cone- or needle-shaped rolling elements for each of the two axial loading directions—tension and compression—thus achieving maximal axial force transmission in both force directions.

Finally, it is within the teaching of the invention that the connecting element disposed opposite the nose ring is divided into at least two race rings, which together surround the circumferential collar of the nose ring. This division permits assembly with the nose ring whose circumferential collar is to be surrounded. Since the second connecting element is already divided into the race ring and the lead-in ring, it is advisable to provide the race ring there with a circumferential collar and to configure it as a nose ring, and to divide the first connecting element in order to permit assembly with the nose ring. The two race rings that are fitted together are preferably screwed together, particularly by means of screws engaging through fastening bores parallel to the axis of rotation. The first connecting element so divided can be sealed in the region of the butt joint between its two race rings, so that no water can seep through, even in the region of said butt joint. This seal can be configured in a comparable manner to the seal between the race ring and the lead-in ring of the second connecting element, i.e., by means of sealing rings surrounding the fastening bores.

Additional features, details, advantages and effects based on the invention will emerge from the following description of a preferred embodiment of the invention and by reference to the drawings.

DESCRIPTION OF THE PREFERRED EMBODIMENTS

Figure 1:
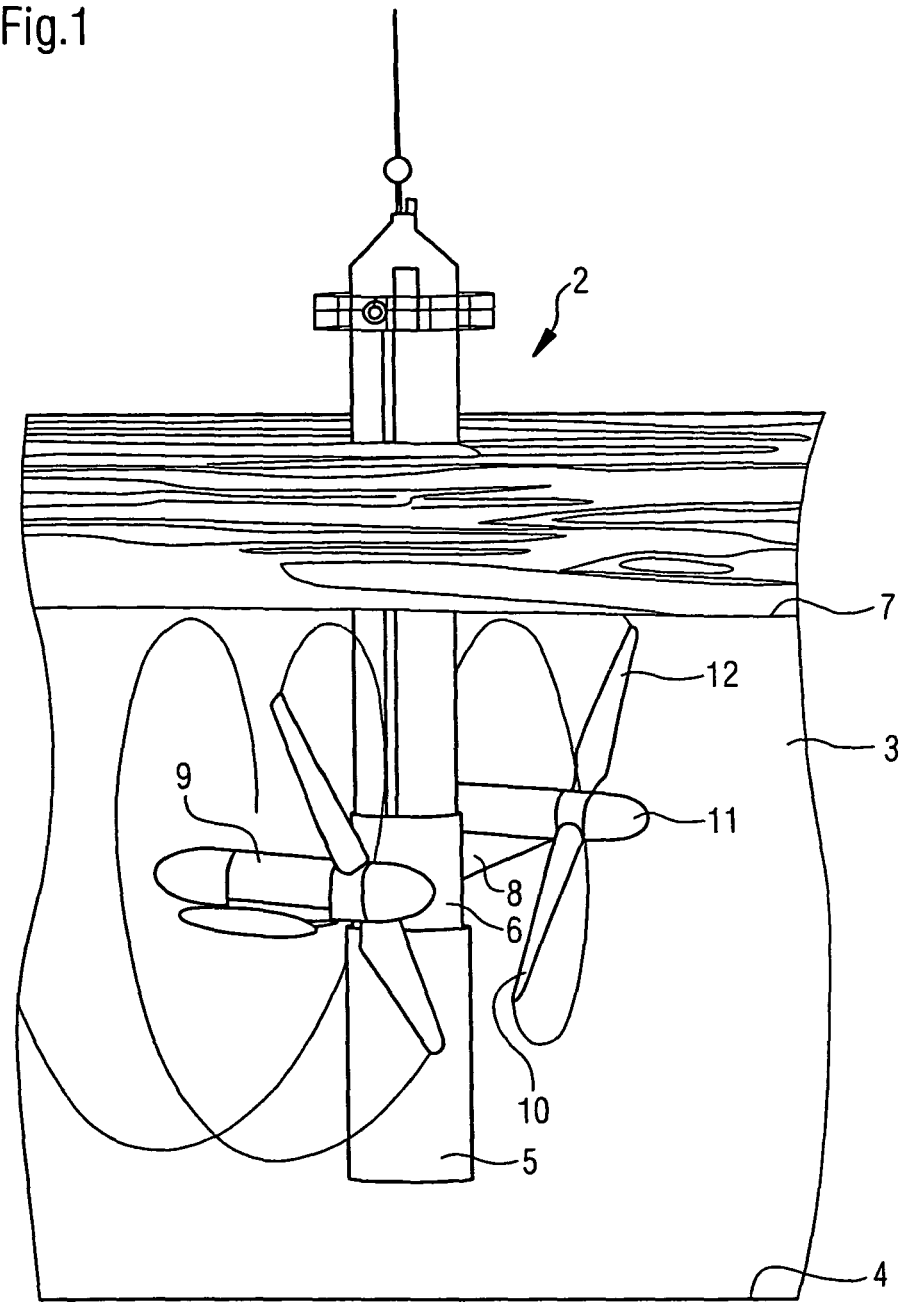
FIG. 1 is a perspective view of a tidal power plant.

FIG. 1 shows an exemplary use for a rotary joint 1 according to the invention for underwater operation, specifically a tidal power plant 2.

The latter is located in the shoreline region of an open body of water that has a tidal range, for example a sea 3 or an ocean. A tower 5 rises off the seabed 4 at the site and juts by its apex out of the sea 3, forming a mooring station for supply and/or maintenance vessels. The power generated is delivered to an electric power grid on land via a cable running along the seabed 4.

A ring- or sleeve-shaped support assembly 6 can be adjusted in the vertical direction along the tower 5, specifically from the underwater position illustrated in FIG. 1 to a position, not shown, above water level 7.

Branching out from the support assembly 6 are two approximately horizontal struts 8 arranged approximately diametrically to each other; these can have an elongate cross section, similarly to a wing, to reduce flow resistance. At their free ends, the two struts 8 each bear a gondola 9, on each of which is disposed at least one turbine 10 having an elongated, approximately cigar-shaped form.

Each turbine 10 has a hub 11, which forms the forward, rotationally movable portion of the respective gondola 9. Extending outward from the hub 11 is a plurality of—in the case illustrated, two diametrically oppositely disposed—turbine vanes 12, which extend outward approximately radially to the axis of rotation of the hub 11. Since the turbine vanes 12 are oriented obliquely to the instantaneous direction of flow, they are driven by the force of the impinging water and are caused to rotate about the axis of rotation of the hub 11.

The pitch angle of such turbine vanes 12 must be varied according to the velocity of the impinging water to keep the rotation speed of the turbine 10 within a predefined range. Each vane 12 is, therefore, connected to the hub 11 by a respective rotary joint 1. The rotary joints 1 not only serve to vary the pitch angle, but must also transmit the force of the water pressure, and also the torque caused by the flow, to the hub 11; finally, they must also ensure that no water can get into the hub 11, or the gondola 9, in the region of the rotary joint 1.

Figure 2:
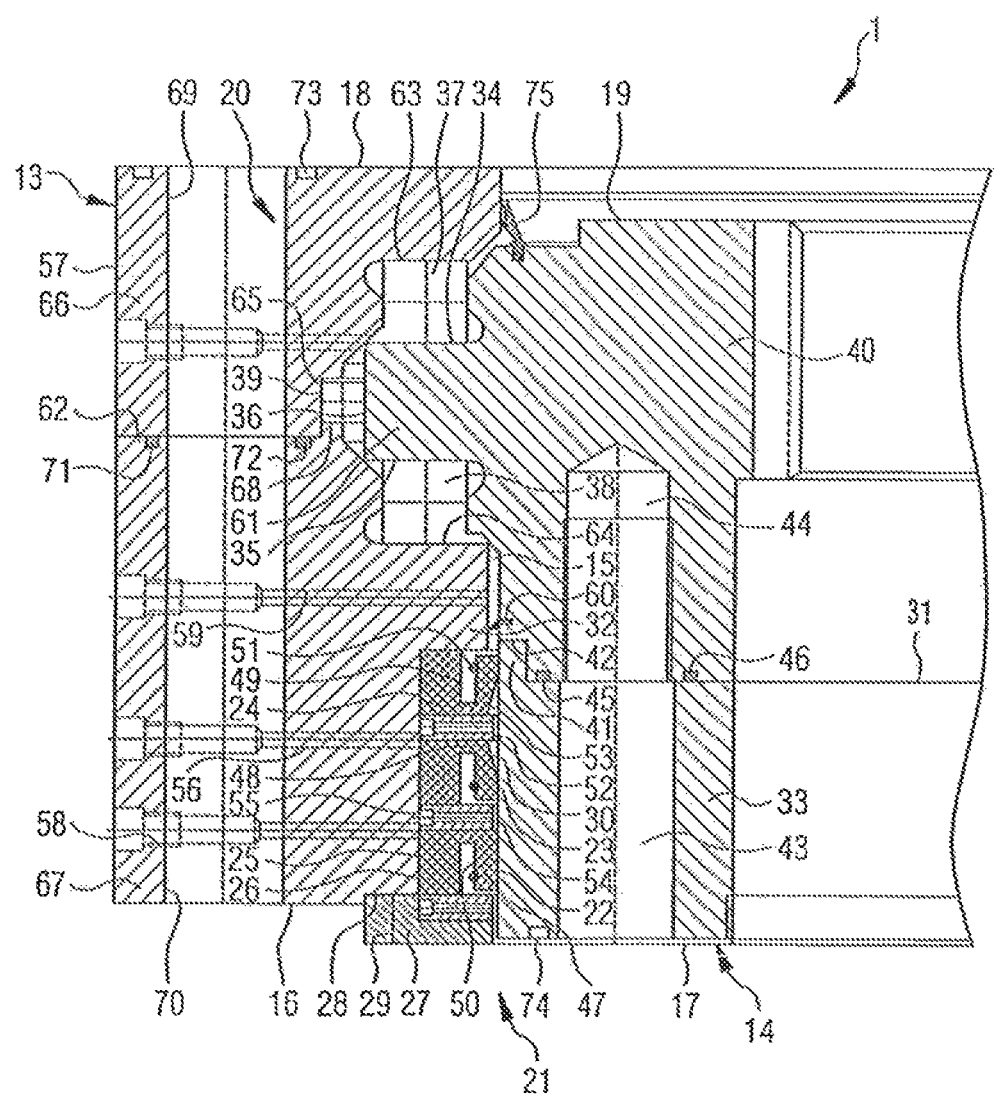
FIG. 2 is a section taken transversely through the rings of a rolling bearing for rotationally movable parts of the tidal power plant of FIG. 1, particularly for the bearings serving to adjust a pitch angle of turbine blades.

The rotary joint 1 depicted in FIG. 2 is used to satisfy these requirements.

An annular arrangement is evident in the drawing, although, due to lack of space, only a broken-away section taken transversely through the ring is illustrated, the axis of rotation and the diametrically opposite region of the ring being well outside the margins of the drawing sheet.

The drawing shows a first, annular connecting element 13 and a second, likewise annular connecting element 14. Both are disposed at approximately the same level, radially one inside the other, it being the case that the second connecting element 14 is radially inside the first connecting element 13. Between the two connecting elements 13, 14 there is a circumferential gap 15, which extends from the two lower end faces 16, 17 of the two connecting elements 13, 14 to between their two upper end faces 18, 19.

The bearing 20, per se, is located in the upper region of the rotary joint 1 illustrated in FIG. 2, which is the region facing the interior of the hub 11, i.e., in the vicinity of the end faces 18, 19, whereas a seal 21 is provided in the lower region, which is the region that faces the exterior or the seawater 3, i.e., in the vicinity of end faces 16, 17.

The seal 21 comprises a number n of sealing rings 22, in the illustrated exemplary embodiment three thereof, i.e., n=3. These sealing rings 22 are arranged one behind the other in the axial direction, i.e., in the direction of the axis of rotation of the rotary joint 1.

The sealing rings 22 preferably have approximately identical, or mirror-symmetrical, cross sections, preferably each circumscribable by a square.

Each of them has at least one circumferential sealing lip 23, which preferably faces toward the axis of rotation—which in FIG. 2 is imagined to be located outside the drawing sheet and to the right—i.e., is oriented radially inward, and, located opposite the sealing lip 23, a region 24 that serves to attach it, and preferably faces away from the axis of rotation, i.e., forms the radially outer periphery 25 of a sealing ring 22 and serves to fix it to a connecting element, in the present embodiment to the radially outer connecting element 13.

For purposes of this fixation, the connecting element 13 is provided with a recess 26 in the region of the transition from its end face 16 facing outward or toward the sea 3, to the gap 15. The recess 26 is provided with a rectangular, preferably elongate shape. In the example shown, its extent is parallel to the axis of rotation of the rotary joint 1 and is approximately three times as long, or preferably more than three times as long, as the radial extent r perpendicular to the axis of rotation of the rotary joint. In general:

$$a \geq n \cdot r,$$

where n is the number of sealing rings 22 to be seated in the recess 26.

A clamping ring 27 serves to axially clamp the sealing rings 22 inside the recess 26. The clamping ring 27 covers the end face of the recess 26 in the region of the adjacent end face 16 of the particular connecting element 13 and an adjoining portion 28 of the end face 16 and is fixed there by means of a plurality of circularly distributed screw connections 29 disposed parallel to the axis of rotation of the rotary joint 1. The circular ring shaped portion 28 of the end face 16 covered by the circular ring shaped clamping ring 27 is countersunk slightly with respect to the rest of the region. The clamping ring 27 can be exactly centered in this countersink, so no balancing is necessary. Since the sealing rings 22 are elastic, the screw connections 29 can be tightened until the clamping ring 27 is flush with, and in a friction lock with, the countersunk portion 28 of the end face 16. In such a case, the sealing rings 22 are slightly compressed elastically and are thereby fixed non-rotatably, by friction locking, with respect to the connecting element 13.

The sealing lips 23 of the sealing rings 22 bear against a common lead-in surface 30 of the respective other connecting element, here the radially inner connecting element 14. This lead-in surface 30 is preferably hardened to minimize wear. There is still non-negligible attrition, however, due to the high contact forces of the sealing lips 23.

So that the entire rotary joint 1 does not have to be replaced if a lead-in surface 30 is damaged, the connecting element 14 is divided into two rings, specifically along a surface, particularly plane 31, that is intersected approximately perpendicularly by the axis of rotation of the rotary joint 1. The dividing plane 31 is located approximately at the level of the inner, radial boundary surface 32 of the recess 26.

Of the two partial rings, the bottom one according to FIG. 2 carries, on its curved surface facing the gap 15, the actual lead-in surface 30 for the sealing lips 23 of the sealing rings 22. It will therefore be identified hereinbelow as the lead-in ring 33.

The other ring of the connecting element 14 is disposed at the level of the bearing 20 and carries one or—as in the embodiment shown—a plurality of races 34, 35, 36 for rolling elements 37, 38, 39 rolling therealong, and will therefore be identified hereinbelow as the race ring 40.

The lead-in ring 33 and the race ring 40 are in surface-abutting contact along the dividing plane 31. To be able to center the two rings 33, 40 easily relative to each other, one of them—here, lead-in ring 33—is provided with a circumferential, collar-like elevation 41 that cooperates with a counterpart in the form of a circumferential groove- or recess-like depression 42 of approximately the same cross section on the respective other ring—here, the race ring 40—by engaging therein, thus ensuring concentric alignment of the two rings 33, 40.

The two rings 33, 40 of the particular connecting element 14 are joined together by means of screws, each of which engages through a respective two mutually aligned bores 43, 44 provided in the two rings 33, 40 and extending approximately parallel to the axis of rotation of the rotary joint 1. One bore 43 is preferably formed as a through-bore in the lead-in ring 33, whereas the bore 44, aligned therewith in the race ring 40, is preferably formed as an internally threaded blind bore. This could also be exactly reversed, of course, where appropriate. If the free end face 17 of the particular ring 33, 40 that is penetrated by through-bores 43 simultaneously serves as a connection surface for connecting a system part, machine part, foundation or the like, the bores 43, 44 can simultaneously also be used to connect the particular connecting element 14 to the particular system part, machine part or foundation.

To prevent the ingress of moisture into the rotary joint 1, or even into the tidal power plant 2 along the dividing plane 31, the bores 43, 44 passing through the dividing plane 31 are sealed. This function is performed by sealing rings 45, which extend between the two end faces that meet along the dividing plane 31, and are preferably each seated in a respective groove-shaped depression 46 in one of the end faces. Each pair of mutually aligned bores 43, 44 is preferably surrounded by such an annular seal 45. It is an alternative, of course, to use only two sealing rings extending along a circle inscribed in the particular ring of bores, on the one side, and a circle circumscribed by the particular ring of bores, on the other side.

The arrangement according to FIG. 2 is deliberately chosen such that the lead-in ring 33 is disposed radially inside the sealing rings 22, since this results in additional advantages:

As can be seen in FIG. 2, the sealing rings 22 each have an approximately U-shaped or V-shaped cross section, with two legs 24, 47 connected to each other along a web 48, whereas in the cross-sectional region on the far side of the web 48 the legs 24, 47 are separated from each other by a slot 49. In cross section, this slot has a longitudinal direction extending parallel to the axis of rotation of the rotary bearing 1.

Whereas the leg 24 facing away from the lead-in surface 30 serves to fasten the particular sealing ring 22 in the recess 26 of the outer connecting element 13, the other leg carries on its outer side, i.e., the side facing toward the lead-in surface 30, the actual sealing lip 23, which is located at approximately half the height of the particular sealing ring 22. The sealing lip 23 can also be configured as a sealing surface, which with the lead-in surface 30 forms an approximately areal contact region instead of a linear contact region.

Provided on an inner face 50, facing the slot 49, of the leg 47, comprising the sealing lip 23, is an approximately groove-shaped, circumferential depression intended to receive a circumferential wire clamp 51. When the latter is tensioned, the leg 47 of the sealing ring 22 comprising the sealing lip 23 is pulled radially inward toward the lead-in surface 30. Very high contact pressures between the sealing lip 23 or sealing surface, on the one hand, and the lead-in surface 30, on the other, can be created in this way.

As can be further understood from the drawing, the individual sealing rings 22 are not arranged directly adjacent each other or the clamping ring 27, but rather, a respective spacer ring 52 is located between each pair of them. Since the sealing rings 22 themselves are formed as sufficiently elastic, the spacer rings 52 can consist of a harder, or more inelastic material, for example metal, ceramic or plastic. Since the spacer rings 52, like the sealing rings 22, are fastened non-rotatably to the connecting element 13 containing the recess 26, they are preferably also centered on that connecting element. To this end, their outer diameter corresponds, as exactly as possible, to the inner diameter of the recess 26, while their inner diameter is preferably slightly larger than the outer diameter of the lead-in surface 30, so that no friction is generated between them.

The spacer rings 52 are provided with a rectangular cross section with a horizontal longitudinal axis, and thus have an approximately disk-shaped geometry. As a result, and due to their relatively high strength, they are able to distribute the contact pressures between adjacent sealing rings 22 generally uniformly over the particular contact surface. Since they also increase the distance between the individual sealing rings 22, they create respective chambers 53 in the region of the lead-in surface 30, between the sealing lips 23 or sealing regions of adjacent sealing rings 22, and these are preferably filled with lubricant to establish a counterpressure to the surrounding water pressure and thereby further reduce the risk of infiltration of water. Lubricating grease is recommended as a lubricant, since its different consistency makes it essentially unable to mix with water; lubricating oil is an alternative, however.

To supply each chamber 53 with lubricant separately, each spacer ring 52 is provided with at least one radially extending lubrication channel 54. At the outer circumference of the spacer ring 52, all the lubrication channels 54 open into a circumferential channel 55. The latter is located approximately at the height of at least one lubrication channel 56 in the connecting element 13 with the recess 26, and extends from the curved inner side of the recess 26 radially to an opposite jacket surface 57 of the particular connecting element 13. A respective connector 58 for a lubricating nipple, or the like, is provided in the region of the mouth openings located there.

An additional such lubricating channel 59 leads directly to the gap 15. One additional, inner seal 60 can be located between the region of the gap 15 thus supplied with lubricant and the seal 21.

Protected against moisture by this seal or these seals 21, 60 is the bearing 20, which is located in the upper region of the rotary joint 1. In the present example, it is configured as a three-row roller bearing with the roller-shaped rolling elements 37, 38, 39.

The races 34, 35, 36 of the race ring 40 are all located on a collar 61 thereof, which projects toward the gap 15, and which, despite its rectangular cross section, is usually referred to by experts as a nose, thus giving reason to also apply the designation "nose ring" to the race ring 40 shaped in this manner. On the top side and the bottom sides of the collar 61 there are formed the races 34, 35; the third race 36 is disposed on an outer periphery of the collar 61.

Since the collar 61 of the race ring 40 extends into the gap 15, the opposite—here, the outer—connecting element 13 must pull back to make room for the collar 61 and the rolling elements 37, 38, 39. Since in the finished state the collar 61 is surrounded by the respective connecting element 13 from both axial directions, i.e., from above and from below, to facilitate assembly it is necessary for the connecting element 13 surrounding the collar 61 to be divided along a surface or plane 62 that is intersected approximately perpendicularly by the axis of rotation of the rotary bearing 1.

Accordingly, in this embodiment the connecting element 13 with the recess 26 is also divided into two rings. However, since, in this case, each of these two rings has at least one race 63, 64, 65, they will be referred to hereinafter as the upper race ring 66 and the lower race ring 67.

The two race rings 66, 67 lie in surface-abutting contact along the dividing plane 62. To be able to center the two rings 66, 67 easily relative to each other, one of them—here, the lower race ring 67—is provided with a circumferential, collar-like elevation 68. This, in conjunction with the end face of the lower race ring 67 that faces the dividing plane 62, forms a groove that cooperates with a circumferential edge on the respective other ring—here, on the upper race ring 66—by receiving it, thus ensuring the concentric orientation of the two rings 66, 67.

The two rings 66, 67 of the particular connecting element 13 are joined together by means of screws, each of which engages through a respective two mutually aligned bores 69, 70 provided in the two rings 66, 67 and extending approximately parallel to an axis of rotation of the rotary joint 1. The bores 69, 70 are preferably configured as through-bores, but the bores 69, 70 in one race ring 66, 67 could also be blind bores provided with an internal thread. The screws inserted through the bores 66, 67 preferably simultaneously serve to connect the particular connecting element 13 to the particular system part, machine part or foundation.

So that no moisture can get into the rotary joint 1, or even into the tidal power plant 2, along the dividing plane 62, the bores 69, 70 passing through the dividing plane 62 are sealed. This purpose is served by sealing rings 71, which extend between the two end faces meeting along the dividing plane 62, and are preferably each seated in a groove-shaped depression 72 in one of the end faces. Each pair of mutually aligned bores 69, 70 is preferably surrounded by such a sealing ring 71. It is an alternative, however, to use only two sealing rings that extend along a circle inscribed in the particular ring of bores 69, 70 on the one side, and along a circle circumscribed by the particular ring of bores on the other side.

The mouth openings of the bores 69 in the upper race ring 66 are also surrounded by annularly extending, groove-shaped depressions 73 in which sealing rings can be seated. For similar purposes, the fastening bores 43 in the lead-in surface 17 of the second connecting element 14 can be surrounded by annularly extending, groove-shaped depressions 74 in which sealing rings can be seated.

Finally, the function of sealing with respect to the interior of the hub 11 is performed by an additional seal 75 in the mouth region of the gap 15, on a far side of the bearing region 20.

The invention claimed is:

1. A rotary joint for underwater operation, the joint comprising a first annular connecting element and a second annular connecting element arranged concentrically with the first connecting element and rotatable relative thereto, an annular gap disposed between the two connecting elements, and at least one row of rolling elements rolling along a raceway on each of the first and the second connecting elements, wherein provided to seal the annular gap is a sealing device having at least one sealing ring, which is fixed to the first connecting element and comprises a circumferential sealing lip or sealing surface that extends along a thrust surface, wherein the second connecting element is divided into at least one raceway ring with at least one raceway and a thrust ring with the thrust surface for at least one sealing ring, wherein the thrust ring is provided with (i) a planar end face as a contact surface for surface-abutting contact with the raceway ring, and (ii) a plurality of fastening bores in this contact surface, distributed circularly about its circumference and serving for the through-passage of fastening screws, by which it is removably connected to the at least one raceway ring, wherein additional sealing rings are disposed between the thrust ring and the at least one raceway ring and surround the fastening bores to prevent the infiltration of water.

2. The rotary joint in accordance with claim 1 wherein the thrust ring is a selected one of (1) a material with the same standard potential or reduction potential E° as the raceway ring, or (2) the same material as the raceway ring.

3. The rotary joint in accordance with claim 1 wherein the thrust ring is of a material with a different standard potential, or reduction potential E°, from the raceway ring, and is of a more noble material than the raceway ring, or a non-rusting material that forms a spontaneous passivation layer.

4. The rotary joint in accordance with claim 1, wherein provided on a selected one of the thrust ring and the race ring is a circumferential centering collar that engages in a circumferential depression of complementary cross section to its own, provided in the respective other ring.

5. The rotary joint in accordance with claim 1, wherein the thrust ring is flange-mounted to the raceway ring.

6. The rotary joint in accordance with claim 5, wherein the first connecting element outwardly surrounds the thrust ring and the at least one raceway ring.

7. The rotary joint in accordance with claim 1, wherein the at least one raceway ring is provided with a plurality of internally threaded blind bores, distributed circularly about its circumference, into which fastening screws are adapted to be inserted.

8. The rotary joint in accordance with claim 1, wherein the thrust surface of the thrust ring is surface-hardened.

9. The rotary joint in accordance with claim 8, wherein the thrust surface is disposed on a cylinder-jacket-shaped, surface region of the thrust ring.

10. The rotary joint in accordance with claim 1, wherein the thrust ring and the raceway ring are disposed one behind the other in an axial direction.

11. The rotary joint in accordance with claim 1, wherein the first connecting element substantially overlaps the thrust ring and the at least one raceway ring in an axial direction.

12. The rotary joint in accordance with claim 1, wherein the at least one sealing ring is received in a recess of the first connecting element.

13. The rotary joint in accordance with claim 12, wherein the at least one sealing ring is clamped fixedly in an axial direction in the recess of the first connecting element by a clamping ring.

14. The rotary joint in accordance with claim 13, wherein the clamping ring is fixedly screwed to an end face of the first connecting element which includes the recess.

15. The rotary joint in accordance with claim 14, wherein the clamping ring overlaps in a radial direction the recess of the first connecting element.

16. The rotary joint in accordance with claim 1, wherein a plurality of the rolling elements is provided.

17. The rotary joint in accordance with claim 16, wherein the at least one row of the rolling elements comprise roller-shaped, barrel-shaped, or needle-shaped rolling elements.

18. The rotary joint in accordance with claim 1, wherein at least one of the connecting elements is configured as a nose ring, with a circumferential collar facing the annular gap, and on which are disposed one or more of the races for the rolling elements rolling therealong.

19. The rotary joint in accordance with claim 18, wherein the connecting element opposite the nose ring is divided into at least two raceway rings which together surround the circumferential collar of the nose ring.

20. A system for generating energy from waterpower, the system comprising at least one rotary joint for underwater operation and comprising a first rotationally symmetrical connecting element, and a second rotationally symmetrical connecting element arranged concentrically with the first connecting element and rotatable relative thereto, an annular gap disposed between the two connecting elements, and at least one row of rolling elements rolling along a raceway on each of the first and the second connecting elements, wherein provided to seal the annular gap is a sealing device having at least one sealing ring, which is fixed to the first connecting element and comprises a circumferential sealing lip or sealing surface that extends along a thrust surface, wherein the second connecting element is divided into at least one raceway ring with at least one raceway, and a thrust ring with the thrust surface for at least one sealing ring, wherein the thrust ring is provided with (i) a planar end face as a contact surface for surface-abutting contact with the raceway ring, and (ii) a plurality of fastening bores in this contact surface, distributed circularly about its circumference and serving for the through-passage of fastening screws, by which it is removably connected to the at least one raceway ring, wherein additional sealing rings are disposed between the thrust ring and the at least one raceway ring and surround the fastening bores to prevent the infiltration of water.

21. The system in accordance with claim 20, wherein the cross section of the sealing ring includes two legs connected to each other at one end, directly or via a web.

22. The system in accordance with claim 21, wherein a first cross-sectional leg of at least one sealing ring is provided with a generally rectangular shape and serves to anchor the ring to the first connecting element in a recess thereof.

23. The rotary system in accordance with claim 22, wherein a second cross-sectional leg of at least one sealing ring is provided on a side facing away from the first cross-sectional leg, proximate its free end, with a sealing lip or sealing surface.

24. The rotary system in accordance with claim 23, wherein disposed in a slot-shaped space between the two cross-sectional legs is a circumferential wire clamp that engages around a back side of the cross-sectional leg comprising the sealing lip or sealing surface, and presses the sealing lip or sealing surface thereof, against the thrust surface of the thrust ring.

25. The rotary system in accordance with claim 24, wherein the at least one sealing ring is disposed such that a slot or indent between the two cross-sectional legs is open to an outer side.

26. The rotary system in accordance with claim 21, wherein a plurality of sealing rings is provided, each two adjacent sealing rings being separated by a respective annular, disk-shaped, spacer element.

27. The rotary system in accordance with claim 26, wherein the spacer element is of a selected one of metal, ceramic and plastic material.

28. The rotary system in accordance with claim 26, wherein the spacer element is provided with at least one channel extending generally in the radial direction.

29. The rotary system in accordance with claim 28, wherein the spacer element is provided with a circumferential groove on the periphery thereof facing the first connecting element.

30. The rotary system in accordance with claim 29, wherein the first connecting element is provided with a lubrication channel at a level of a spacer element.

31. The rotary system in accordance with claim 30, wherein the lubrication channel contains grease as a lubricant.

32. A rotary joint for underwater operation, the joint comprising a first annular connecting element and a second annular connecting element arranged concentrically with the first connecting element and rotatable relative thereto, an annular gap disposed between the two connecting elements, and at least one row of rolling elements rolling along a raceway on each of the first and the second connecting elements, wherein provided to seal the annular gap is a sealing device having at least one sealing ring, which is fixed to the first connecting element and comprises a circumferential sealing lip or sealing surface that extends along a thrust surface, wherein the second connecting element is divided into at least one raceway ring with at least one raceway and a thrust ring with the thrust surface for at least one sealing ring, wherein the thrust ring is provided with (i) a planar end face as a contact surface for surface-abutting contact with the raceway ring, and (ii) a plurality of fastening bores in this contact surface, distributed circularly about its circumference and serving for the through-passage of fastening screws, by which it is removably connected to the at least one raceway ring, wherein additional sealing rings are disposed between the thrust ring and the at least one raceway ring and surround the fastening bores to prevent the infiltration of water, either in that each fastening bore is provided with an additional seal ring being concentric with it, or in that one such additional sealing ring is provided on each side of the circle of fastening bores.

33. A system for generating energy from waterpower, the system comprising at least one rotary joint for underwater operation and comprising a first rotationally symmetrical connecting element, and a second rotationally symmetrical connecting element arranged concentrically with the first connecting element and rotatable relative thereto, an annular gap disposed between the two connecting elements, and at least one row of rolling elements rolling along a raceway on each of the first and the second connecting elements, wherein provided to seal the annular gap is a sealing device having at least one sealing ring, which is fixed to the first connecting element and comprises a circumferential sealing lip or sealing surface that extends along a thrust surface, wherein the second connecting element is divided into at least one raceway ring with at least one raceway, and a thrust ring with the thrust surface for at least one sealing ring, wherein the thrust ring is provided with (i) a planar end face as a contact surface for surface-abutting contact with the raceway ring, and (ii) a plurality of fastening bores in this contact surface, distributed circularly about its circumference and serving for the through-passage of fastening screws, by which it is removably connected to the at least one raceway ring, wherein additional sealing rings are disposed between the thrust ring and the at least one raceway ring and surround the fastening bores to prevent the infiltration of water, either in that each fastening bore is provided with an additional seal ring being concentric with it, or in that one such additional sealing ring is provided on each side of the circle of fastening bores.

* * * * *